United States Patent
Chun Wee et al.

(10) Patent No.: US 7,784,725 B2
(45) Date of Patent: Aug. 31, 2010

(54) REVERSE PREVENTION MECHANISM FOR LEVER DRAG REEL

(75) Inventors: Chew Chun Wee, Pontian (MY);
Benedict Foo Kok Liang, Pontian (MY)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/426,923

(22) Filed: Apr. 20, 2009

(65) Prior Publication Data
US 2009/0277984 A1 Nov. 12, 2009

(30) Foreign Application Priority Data
May 12, 2008 (JP) .............................. 2008-125296

(51) Int. Cl.
*A01K 89/01* (2006.01)
(52) U.S. Cl. .................. 242/247; 242/249; 242/255
(58) Field of Classification Search ................. 242/247, 242/249, 255, 257
See application file for complete search history.

(56) References Cited

U.S. PATENT DOCUMENTS

| | | | |
|---|---|---|---|
| 3,315,913 A | 4/1967 | Grieten | |
| 4,738,410 A | 4/1988 | Yamaguchi | |
| 5,058,447 A * | 10/1991 | Ikuta | 74/371 |
| 5,064,138 A | 11/1991 | Sato | |
| 5,560,562 A * | 10/1996 | Hartmann | 242/255 |
| 6,431,482 B1 * | 8/2002 | Ikuta | 242/297 |
| 6,505,787 B1 * | 1/2003 | Nilsen | 242/255 |
| 6,672,526 B1 * | 1/2004 | Bledsoe et al. | 242/255 |
| 7,559,499 B2 * | 7/2009 | Nakagawa et al. | 242/246 |

FOREIGN PATENT DOCUMENTS

| | | |
|---|---|---|
| JP | H10-313751 A | 12/1998 |
| JP | 2004-236586 A | 8/2004 |
| JP | 2007-104963 A | 4/2007 |

* cited by examiner

*Primary Examiner*—Emmanuel M Marcelo
(74) *Attorney, Agent, or Firm*—Global IP Counselors, LLP (57) ABSTRACT

A reverse prevention mechanism is configured to prevent reverse rotation of a drag disk, in a line-releasing direction, when braking a spool. The reverse prevention mechanism includes a rotation member, a pawl member, and an urging member. The rotation member includes an outer periphery portion with a plurality of engaging members. The outer periphery portion is arranged between the second pinion gear and the drag disk, and is capable of rotating integrally with the drag disk. The pawl member is pivotally coupled to the reel unit. The pawl member is arranged in an engagement position and a remote position. In the engagement position, reverse rotation is prevented when the pawl member is engaged with the outer periphery portion of the rotation member. In the remote position, the pawl member is detached from the outer periphery portion. The urging member urges the pawl member toward the engagement position.

11 Claims, 6 Drawing Sheets

REVERSE PREVENTION MECHANISM FOR LEVER DRAG REEL

CROSS-REFERENCE TO RELATED APPLICATIONS

This application claims priority under 35 U.S.C. §119 to Japanese Patent Application No. 2008-125296 filed on May 12, 2008. The entire disclosure of Japanese Patent Application No. 2008-125296 is hereby incorporated herein by reference.

BACKGROUND OF THE INVENTION

1. Field of the Invention

The present invention generally relates to a reverse prevention mechanism and, more specifically, to a reverse prevention mechanism for a lever drag reel for preventing reverse rotation (i.e., rotation in a line-releasing direction) of a drag disk receiving transmission of rotation of a handle via a pinion gear by braking a spool capable of rotating with respect to a reel unit.

2. Background Information

The dual-bearing reel is classified into a lever drag reel and a star drag reel. The lever drag reel is configured to brake rotation of a spool in a line-releasing direction with a drag lever. The drag lever is attached to a handle attachment side of a reel unit. The drag lever is capable of pivoting around a spool shaft. On the other hand, the star drag reel is configured to brake the spool with a star drag. The star drag is capable of rotating around a handle shaft.

In general, the lever drag reel is provided with a reverse prevention mechanism for applying the drag force to a spool when the spool rotates in the line-releasing direction. The reverse prevention mechanism includes a one-way clutch for preventing rotation of the drag disk in the line-releasing direction. The drag disk is capable of making contact with the spool.

The reverse prevention mechanism for the lever drag reel is generally mounted to a handle shaft. Specifically, the reverse prevention mechanism is mounted to the handle shaft for integrally rotating with the handle shaft. The reverse prevention mechanism includes a rotation member, a pawl member, and an urging member. The rotation member is arranged along with a main gear. An example of the rotation member is a ratchet wheel. The pawl member is pivotally mounted to the reel unit for engaging with the rotation member. The urging member urges the pawl member toward the engagement position. For example, Japan Patent Application Publication No. JP-A-H10-313751 discloses the above-mentioned configuration.

According to the reverse prevention mechanism, when the spool rotates in the line-releasing direction, the drag force is transmitted from the drag disk to the rotation member mounted to the handle shaft via a pinion gear and the main gear. The pawl member subsequently engages with the rotation member. Thus, the engaged rotation member and the pawl member receive the load in the application of the drag force.

On the other hand, some lever drag reels are configured to switch rotation speed of the handle between high and low levels (hereinafter referred to as "two-stage variable-speed lever drag reel"). In the lever drag reels of this type, a mechanism for switching the rotation speed of the handle is arranged in the interior of the handle shaft. Accordingly, the structure of the handle shaft will be complex and the strength thereof will be lowered. Consequently, it is quite difficult to attach a ratchet wheel to the handle shaft. In response to the structural problem, the two-stage variable-speed lever drag reel is configured to prevent rotation of the drag disk in the line-releasing direction with a large-diameter pinion gear of two pinion gears meshing with two main gears. Japan Patent Application Publication No. JP-A-2004-236586 discloses the configuration.

The conventional reverse prevention mechanism with a pinion gear includes a pawl member and an urging member. The pawl member is coupled to the reel unit, and is capable of pivoting in an engagement position and a remote position. The pawl member is engaged with a large-diameter part of the pinion gear on the engagement position while the pawl member is detached and away from the pinion gear on the remote position. The urging member urges the pawl member toward the engagement position. The pinion gear includes a tubular shaft portion and gear teeth. The spool shaft penetrates the shaft portion of the pinion gear. Diameter of the gear teeth is larger than that of the shaft potion. An engagement portion is formed on the shaft portion, and the engagement portion is engaged with the drag disk. Accordingly, the pinion gear is capable of integrally rotating with the drag disk. With the mesh between the pinion gear and the pawl member, it is possible to simplify the structure of the reverse rotation mechanism without complicating the structure of the handle shaft.

However, according to the conventional art of the former publication, the one-way clutch is mounted to the handle shaft. Therefore, strong force will be applied to the mesh between the pinion gear and the main gear in the application of the drag force. Accordingly, gear teeth of the pinion gear receive excessive force in the application of the drag force, and may be damaged.

On the other hand, according to the conventional art of the latter publication, engagement between the pinion gear and the pawl member prevents reverse rotation of the drag disk. Accordingly, the pinion gear and the pawl member may receive large load in the application of the drag force. In response to this, the latter conventional art produces the configuration that the pawl member is engaged with the large-diameter pinion gear. The large-diameter pinion gear has gear teeth with higher strength than those of the small-diameter pinion gear.

However, when the lever drag reel is compactly formed, the number of the gear teeth of the large-diameter pinion gear will be accordingly reduced and diameter of the pinion gear will be reduced. Therefore, strength of the gear teeth will be lowered. When large drag force is applied while the pawl member is engaged with the pinion gear, the gear teeth will be possibly damaged.

SUMMARY OF THE INVENTION

Accordingly, aspects of the present invention have been created to solve the above-mentioned problems occurring in the conventional practice and to produce a reverse prevention mechanism for a lever drag reel for preventing damage of gear teeth of a pinion gear even when the lever drag reel is compactly formed.

According to one aspect of the present invention, a reverse prevention mechanism for a lever drag reel is provided to prevent reverse rotation of a drag disk a line-releasing direction by braking a spool, which is capable of rotating with respect to a reel unit. The drag disk is rotated by way of a handle and a pinion gear. The reverse prevention mechanism includes a rotation member, a pawl member, and an urging member. The rotation member is capable of rotating integrally with the drag disk. The rotation member has an outer periphery portion, and the outer periphery portion includes a plurality of first engaging members. The outer periphery portion is arranged between the pinion gear and the drag disk. The pawl member is pivotally coupled to the reel unit. As such, the pawl member is capable of being positioned in an engagement position and a remote position. In the engagement position, a tip of the pawl member is engaged with the outer periphery portion for preventing the reverse rotation of the drag disk. In the remote position, the pawl member is detached and away from the outer periphery portion. The urging member is configured to urge the pawl member toward the engagement position.

According to the reverse prevention mechanism, when the drag disk is about to rotate in the line-releasing direction in accordance with the rotation of the spool in the line-releasing direction in the application of the drag force, the pawl member urged to the engagement position is engaged with the rotation member. Reverse rotation (i.e., rotation in the line-releasing direction) of the drag disk is thereby prevented. With the configuration, the friction force is generated between the drag disk and the spool, and the spool is accordingly braked. In this case, force is applied from the rotation member to the pawl member, and the outer peripheral portion of the rotation member receives the load. As described above, the rotation member is provided between the pinion gear and the drag disk, and the pawl member is engaged with the rotation member. Therefore, both of the rotation member and the pawl member are capable of receiving the load in the application of the drag force. In other words, the pinion gear does not receive the load in the application of the drag force. Therefore, damage of the gear teeth of the pinion gear is prevented.

A reverse prevention mechanism according to another aspect of the present invention wherein the outer peripheral portion of the rotation member is coupled to the drag disk. The rotation member is capable of integrally rotating with the drag disk.

A reverse prevention mechanism according to yet further aspect of the present invention wherein the outer peripheral portion further includes a plurality of first engaging members engaged with the drag disk.

A reverse prevention mechanism according to another aspect of the present invention wherein diameter of the outer peripheral portion of the rotation member is larger than that of the pinion gear and the rotation member includes a through hole for allowing the pinion gear to pass there through.

These features, aspects and advantages of the present invention will become apparent to those skilled in the art from the following detailed description, which, taken in conjunction with the annexed drawings, disclose embodiments of the present invention.

BRIEF DESCRIPTION OF THE DRAWINGS

Referring now to the attached drawings which form a part of this original disclosure.

DETAILED DESCRIPTION OF THE EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
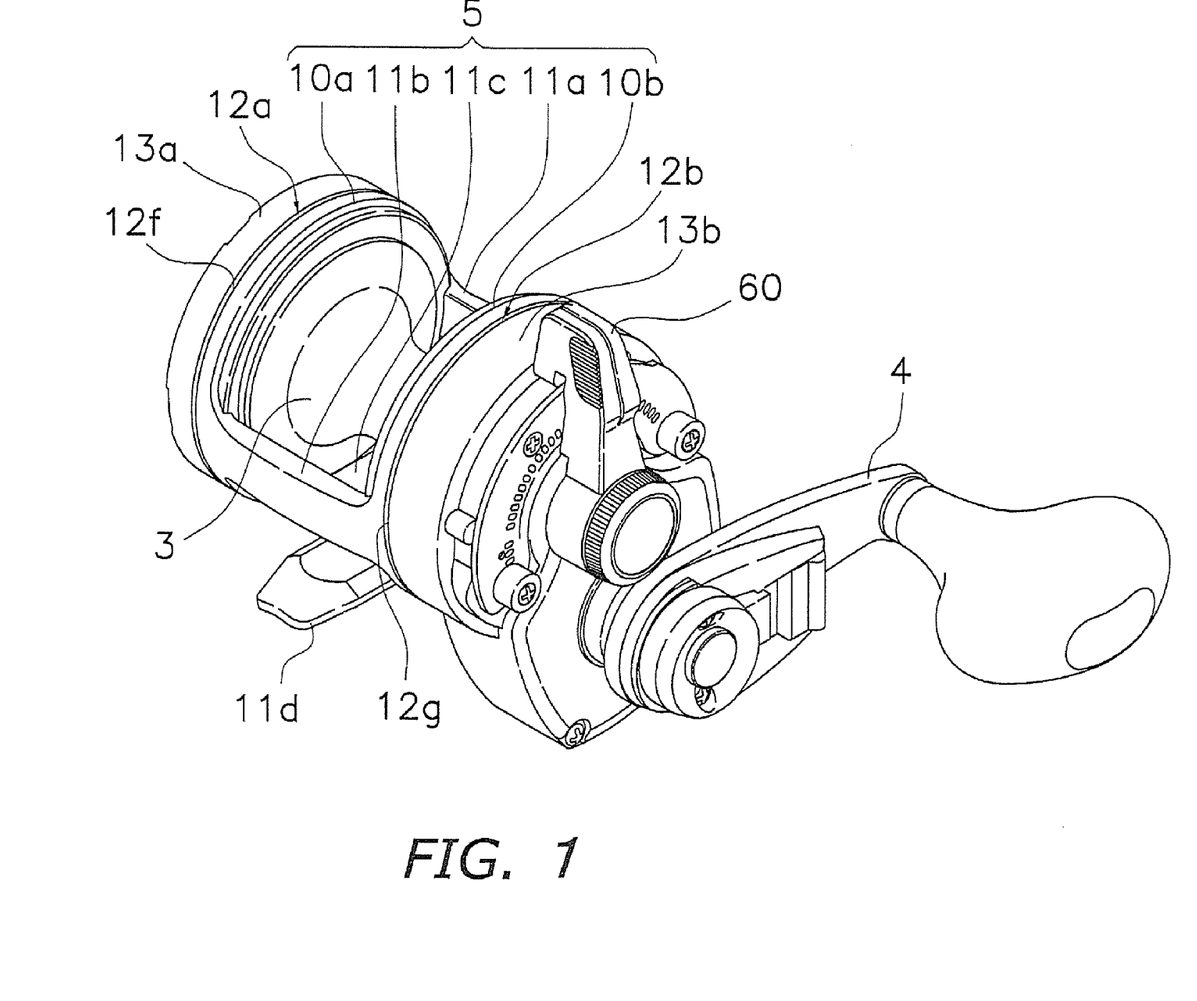
FIG. 1 is a perspective view of a lever drag reel of an embodiment of the present invention.
Figure 2:
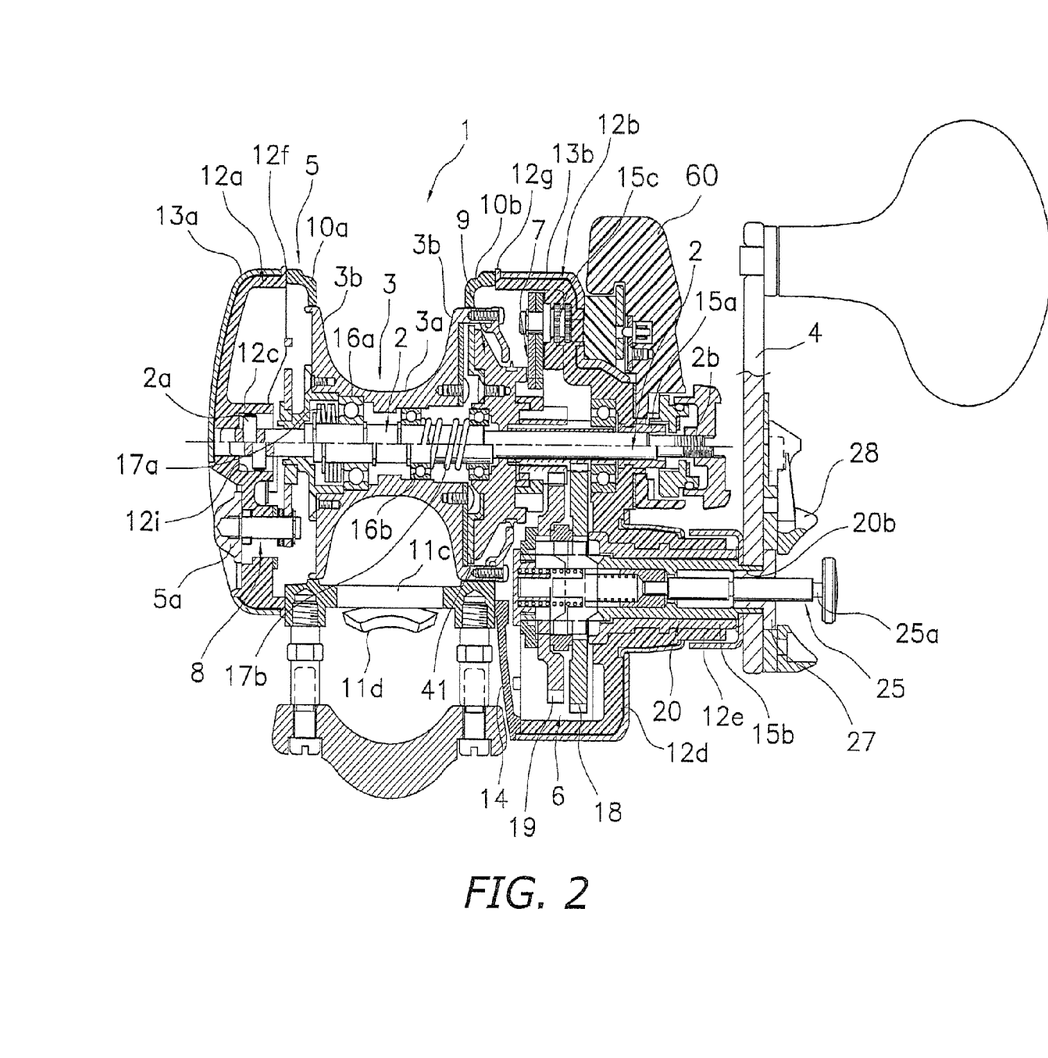
FIG. 2 is a cross-sectional view of the lever drag reel.

As illustrated in FIG. 1, a dual-bearing reel of an embodiment of the present invention is a medium-sized lever drag reel. As illustrated in FIGS. 1 and 2, the lever drag reel includes a tubular reel unit 1, a spool shaft 2, a spool 3, and a handle 4. The spool shaft 2 is mounted to the center of the reel unit 1. The spool shaft 2 is prevented from rotating but is allowed to move in a shaft direction. The spool 3 is supported by the spool shaft 2. The spool 3 is allowed to rotate but is prevented from moving in the shaft direction. The handle 4 is arranged lateral to the reel unit 1.

As illustrated in FIG. 2, the reel unit 1 accommodates a rotation transmission mechanism 6, a reverse prevention mechanism 7, and a lever drag mechanism 9. The rotation transmission mechanism 6 is configured to transmit rotation of the handle 4 to the spool 3. The reverse prevention mechanism 7 is configured to prevent rotation of an after-mentioned drag disk 42 in a line-releasing direction. The lever drag mechanism 9 is configured to brake rotation of the spool 3 in the line-releasing direction. Note that rotation of the drag disk 42 in the line-releasing direction is hereinafter referred to as "reverse rotation of the drag disk 42".

The reel unit 1 includes a metal frame 5. The metal frame 5 includes a pair of first and second side plates 10a and 10b, and coupling portions 11a, 11b, and 11c. The first and second side plates 10a and 10b are right and left dish-shaped plates, and are made of metal. Front, rear and bottom portions of the first and second side plates 10a and 10b are coupled to each other by the coupling portions 11a, 11b, and 11c. Additionally, a rod attachment portion lid is integrally formed with the coupling portion 11c of the frame 5 for attaching the lever drag reel to a fishing rod.

Furthermore, the reel unit 1 includes first to fourth cover members 12a, 12b, 13a, and 13b, and a lid member 14. The first and second cover members 12a and 12b cover outer sides of the first and second side plates 10a and 10b, respectively. For example, the first and second cover members 12a and 12b are made of high-stiffness resin (e.g., glass fiber reinforced polyamide resin). The third and fourth cover members 13a and 13b are used for ornamental purpose. The third and fourth cover members 13a and 13b cover the first and second cover members 12a and 12b, respectively. The third and fourth cover members 13a and 13b are made of light metal (e.g., aluminum alloy). The lid member 14 covers the inner side of the second cover member 12b. The lid member 14 is made of high-stiffness resin. The first and second side plates 10a and 10b have openings, and the spool 3 passes through the openings. A boss 12c is formed in the interior of the first cover member 12a. As illustrated in FIG. 2, the boss 12c supports the left end of the spool shaft 2. The spool shaft 2 is accordingly prevented from rotating but is allowed to move in the shaft direction. A spool sound generation mechanism 8 is arranged in the interior of the first cover member 12a. The spool sound generation mechanism 8 is configured to generate sounds in conjunction with rotation of the spool 3. The spool sound generation mechanism 8 is configured to switch the sound generation condition on/off in conjunction with the operation of a click button 5a.

Figure 3:
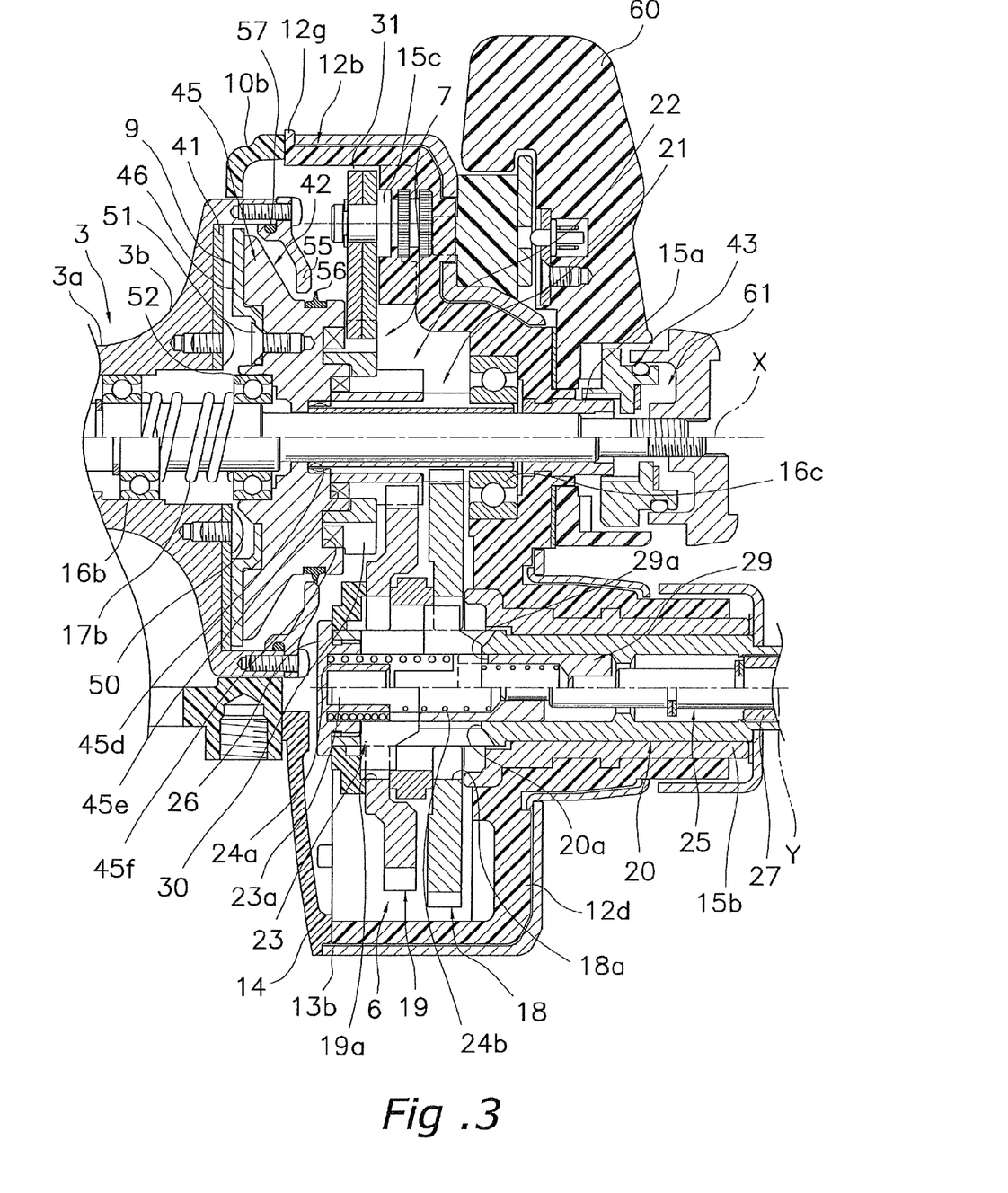
FIG. 3 is an enlarged cross-sectional view of the right part of the lever drag reel.
Figure 4:
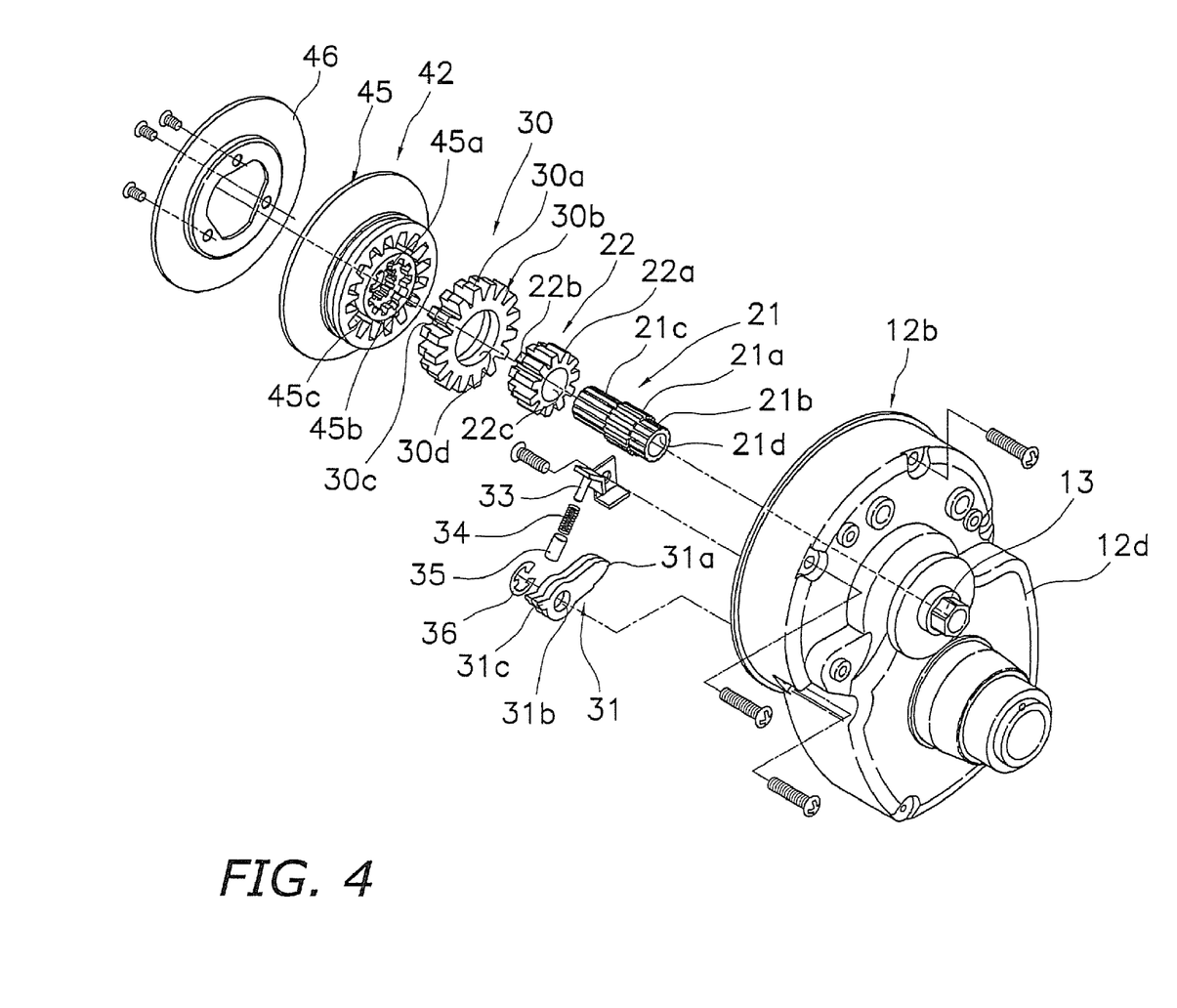
FIG. 4 is an exploded perspective view of a reverse prevention mechanism.

As illustrated in FIG. 3, the second cover member 12b on the handle 4 side includes a bulge portion 12d. The bulge portion 12d protrudes radially and axially outward. As illustrated in FIGS. 1 and 4, the bulge portion 12d slightly tilts forward and radially protrudes.

As illustrated in FIG. 2, the bulge portion 12d is provided with the rotation transmission mechanism 6. The bulge portion 12d is provided with a first insertion member 15a by means of the insert molding. The first insertion member 15a is a tubular member made of metal with fine tribological property (e.g., brass). The first insertion member 15a radially protrudes outward, and supports the right end of the spool shaft 2. The spool shaft 2 is accordingly capable of moving in the axial direction. Additionally, a support tubular portion 12e is formed below the first insertion member 15a. The support tubular portion 12e supports a handle shaft 20 of the handle 4. The support tubular portion 12e protrudes axially outward.

A second insertion member 15b is formed in the interior of the support tubular portion 12e by means of the insert molding. The second insertion member 15b is a tubular member made of metal with fine tribological property (e.g., brass). The second insertion member 15b rotatably supports the handle shaft 20.

Figure 5:
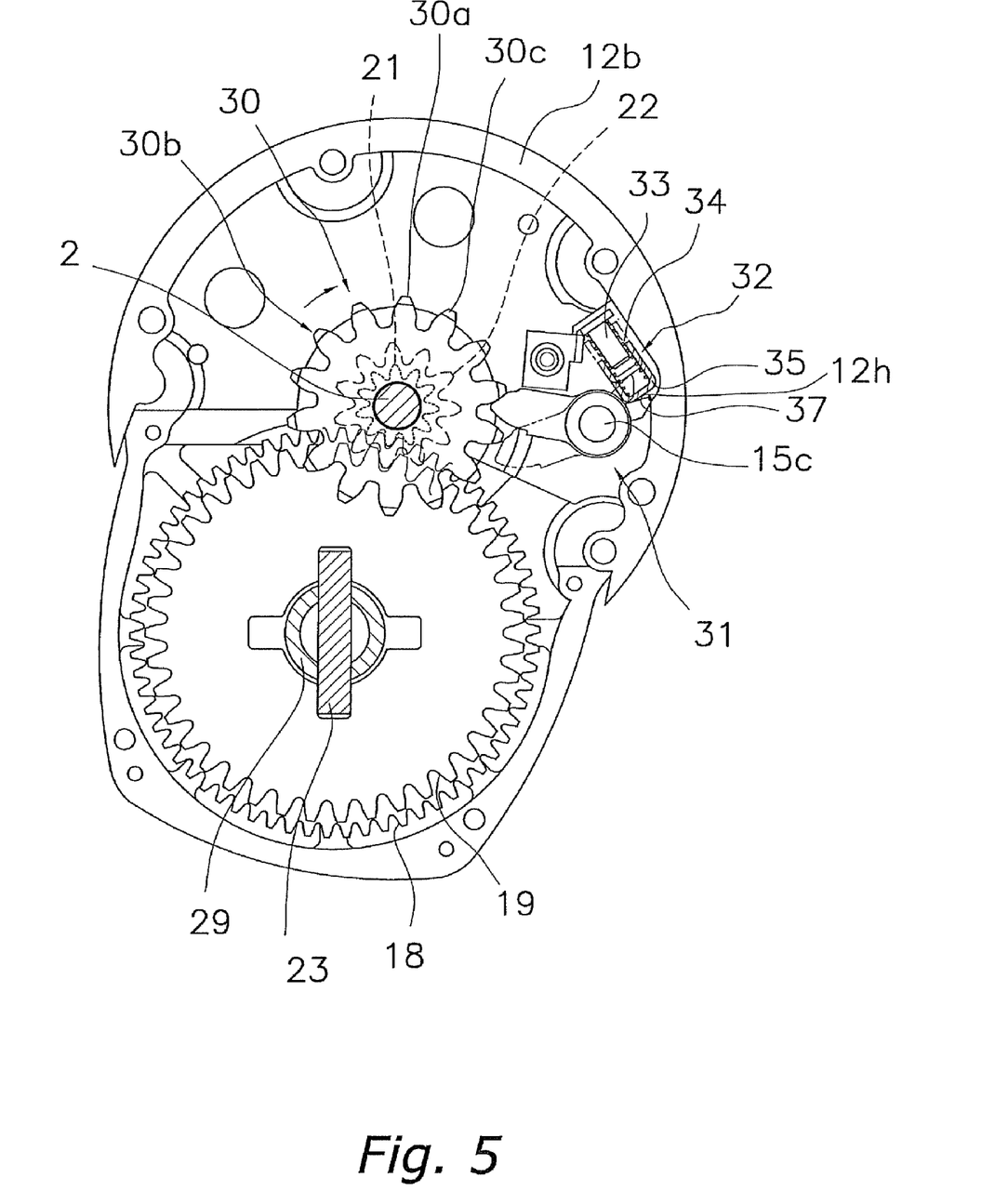
FIG. 5 is a partial cross-sectional view of the reverse prevention mechanism seen from its inside.
Figure 6:
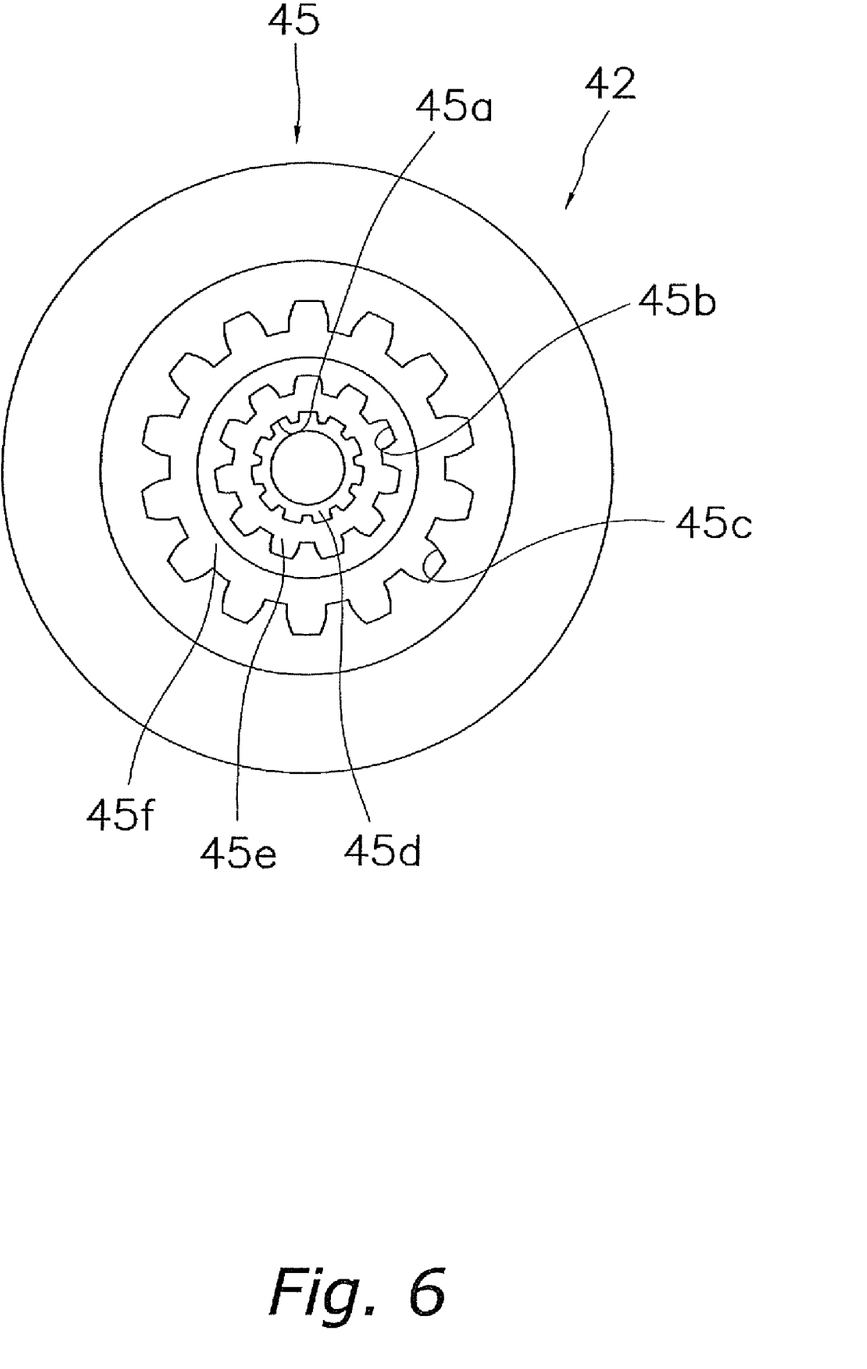
FIG. 6 is a front view of a drag disk.

A third insertion member 15c is formed in a rear portion of the second cover member 12b above the bulge portion 12d by means of the insert molding. The third insertion member 15c is a shaft-shaped member made of metal with fine tribological property (e.g., brass). The third insertion member 15c pivotally supports an after-mentioned pawl member 31 of the reverse prevention mechanism 7. In the illustration of FIG. 3, the third insertion member 15c seems to be arranged in the upper portion of the second cover member 12b. However, as illustrated in FIG. 5, it is actually arranged in the rear portion of the second cover member 12b.

As illustrated in FIG. 2, the third and fourth cover members 13a and 13b covers the first and second cover members 12a and 12b. The shapes of the third and fourth cover members 13a and 13b fit with the outer shapes of the first and second cover members 12a and 12b, respectively. Additionally, protrusions 12f and 12g are formed on the edges of the first and second cover members 12a and 12b, respectively. Edges of the third and fourth cover members 13a and 13b abut on the protrusions 12f and 12g. Only the protrusions 12f and 12g are exposed to the outside because the other portions of the first and second cover members 12a and 12b made of resin are covered by the third and fourth cover members 13a ad 13b. When the third and fourth cover members 13a and 13b are made of an aluminum-alloy thin plate by means of the press molding, the edges of the third and fourth cover members 13a and 13b may be irregularly formed. However, the irregular portions will be unnoticed with the protrusions 12f and 12g.

As described above, the spool shaft 2 is supported by the boss 12c of the first cover member 12a and the first insertion member 15a of the second cover member 12b. The spool shaft 2 is thereby allowed to move in the axial direction but is prevented from rotating. Additionally, a rotation prevention pin 2a is attached to the left end of the spool shaft 2. Specifically, the rotation prevention pin 2a radially penetrates the spool shaft 2. Also, a rotation prevention slit 12i is formed along the radial direction in the boss 12c of the first cover member 12a. The rotation prevention slit 12i is engaged with the rotation prevention pin 2a.

Two bearings 16a and 16b are arranged on the outer peripheral surfaces of the spool shaft 2. The spool 3 is rotatably supported by the spool shaft 2 through the bearings 16a and 16b. The bearing 16a is urged radially inward (i.e., rightward direction in FIG. 2) by a first spring member 17a. The first spring member 17a is a disc spring. On the other hand, the bearing 16b is urged radially inward (i.e., leftward direction in FIG. 2) by a second spring member 17b. The second spring member 17b is a coil spring.

Inward movement of the axially inner sides of the bearings 16a and 16b is regulated by the spool 3 and the spool shaft 2. Accordingly, the spool shaft 2 and the spool 3 are capable of integrally moving in the axial direction. The lever drag mechanism 9 moves the spool shaft 2 and the spool 3 together in the axial direction. A male threaded portion 2b is formed on the right end of the spool shaft 2. The male threaded portion 2b is screwed into an element of an after-mentioned movement mechanism 43 of the lever drag mechanism 9. Additionally, an after-mentioned small-diameter first pinion gear 21 of the rotation transmission mechanism 6 is attached to the outer periphery of the spool shaft 2.

As illustrated in FIG. 2, the spool 3 includes a bobbin trunk 3a and left and right flange portions 3b. The flange portions 3b are arranged on the both ends of the bobbin trunk 3a, and are integrally formed with the bobbin trunk 3a. A friction disk 41 is fixed to the end surface of the right flange portion 3b by means of a predetermined screw. The friction disk 41 forms a part of the lever drag mechanism 9.

As illustrated in FIG. 2, the handle 4 is fixed to the protruding end of the tubular handle shaft 20. The handle shaft 20 is arranged below and parallel to the spool shaft 2. As described above, the handle shaft 20 is rotatably supported by the reel unit 1 through the second insertion member 15b. As illustrated in FIG. 3, a slit 20a is formed on the base end of the handle shaft 20. The slit 20a penetrates the handle shaft 20 in the radial direction. On the other hand, as illustrated in FIG. 2, a female threaded portion 20b is formed on the inner surface of the front end of the handle shaft 20. The threaded portion 20b is used for fixing the handle 4.

Structure of Rotation Transmission Mechanism

The rotation transmission mechanism 6 is provided with a variable speed mechanism for switching speed at high and low stages. As illustrated in FIG. 3, the rotation transmission mechanism 6 includes a first main gear 18, a second main gear 19, the first pinion gear 21, a second pinion gear 22, an engagement piece 23, compression springs 24a and 24b, and an operation shaft 25. The first and second main gears 18 and 19 are rotatably supported by the handle shaft 20 of the handle 4. The first main gear 18 is used for winding a fishing line at high speed while the second main gear 19 is used for winding the fishing line at low speed. The first and second pinion gears 21 and 22 are rotatably attached to the spool shaft 2 while meshing with the first and second main gears 18 and 19, respectively. The engagement piece 23 couples the handle shaft 20 and either of the first and second main gears 18 and 19, and transmits rotation of the handle shaft 20 to either of them. The compression springs 24a and 24b are arranged on the both sides of the engagement piece 23. The compression springs 24a and 24b position the engagement piece 23. The operation shaft 25 sets a position of the engagement piece 23.

The first and second main gears 18 and 19 include circular support holes (not illustrated in the figure) in their center parts, respectively. Additionally, the first and second main gears 18 and 19 include slits 18a and 19a, respectively. The slits 18a and 19a are perpendicular to each other. The slits 18a and 19a are engaged with the engagement piece 23. The second main gear 19 is curved toward the first main gear 18 for avoiding contact with the rotation member 30 of the reverse prevention mechanism 7.

The first pinion gear 21 is a tubular member made of metal with a corrosion resistance property (e.g., non-magnetic stainless alloy). The right end of the first pinion gear 21 is rotatably supported by a bearing 16c. The bearing 16c is attached to the bulge portion 12d outside the spool shaft 2. On the other hand, the left end of the first pinion gear 21 is engaged with the drag disk 42 of the lever drag mechanism 9. Thus the first pinion gear 21 is capable of integrally rotating with the drag disk 42. As illustrated in FIG. 4, the first pinion gear 21 includes first gear teeth 21a, a first bearing support portion 21b, and a first engaging portion 21c. The first gear teeth 21a mesh with the first main gear 18. The first bearing support portion 21b is supported by the bearing 16c. The first engaging portion 21c is arranged on the opposite side of the first bearing support portion 12b through the first gear teeth 21a. A first through hole 21d is formed on the inner periphery of the first pinion gear 21. The spool shaft 2 passes through the first through hole 21d. A gap of approximately 0.05 to 0.3 mm is produced between the first through hole 21d and the spool shaft 2. With the gap, the first pinion gear 21 is capable of smoothly rotating relative to the spool shaft 2.

The first pinion gear 21 is formed by the cutting work. Specifically, a component is firstly prepared for the cutting work. This component has the first gear teeth 21a on its entire surface. Then, axial-end portions of the gear teeth 21a are radially cut to some extent while an interposed portion between the axial-end portions remains to be uncut. Thus, diameters of the axial-end portions result in smaller than diameter of the interposed portion. In other words, steps are formed between the axial-end portions and the interposed portion. The steps are used for positioning the first pinion gear 21. Also, the radially-cut gear teeth 21a on the axial-end portions are used for preventing rotation of the first pinion gear 21 when attached to predetermined elements.

In short, the first bearing support portion 21b and the first engaging portion 21c are formed on the both sides of the first gear teeth 21a as the result of the cutting work. Diameters of the first bearing support portion 21b and the first engaging portion 21c are smaller than diameter of the first gear teeth 21a. Additionally, the first bearing support portion 21b and the first engaging portion 21c have small-diameter teeth formed by radially cutting the first gear teeth 21a, respectively. The first pinion gear 21 is arranged between the drag disk 42 and the inner ring of the bearing 16c. The first pinion gear 21 is thereby prevented from moving in the axial direction.

The second pinion gear 22 is a tubular member made of the same material as the first pinion gear 21. As illustrated in FIG. 3, the left end of the second pinion gear 22 is engaged with the drag disk 42. The second pinion gear 22 is thereby capable of integrally rotating with the drag disk 42. As illustrated in FIG. 4, the second pinion gear 22 includes second pinion gear teeth 22a and a second engaging portion 22b. The second pinion gear teeth 22a mesh with the second main gear 19. The second engaging portion 22b is arranged adjacent to the second pinion gear teeth 22a. A second through hole 22c is formed in the inner periphery of the second pinion gear 22. The first engaging portion 21c of the first pinion gear 21 passes through the second through hole 22c.

A gap of approximately 0.01 to 0.05 mm is formed between the second through hole 22c and the first engaging portion 21c. With the gap, the second pinion gear 22 does not make contact with the first pinion gear 21. However, the second pinion gear 22 is substantially supported by the first pinion gear 21.

The second pinion gear 22 is formed by the cutting work. Specifically, a component is firstly prepared for the cutting work. This component has the second gear teeth 22a on its entire surface. Then, either of axial end portions of the second gear teeth 22a is radially cut to some extent while the rest of the second gear teeth 22a remain to be uncut. Thus, diameter of the radially-cut axial end portion results in smaller than that of the uncut portion. In other words, a step is formed between the radially-cut axial-end portion and the uncut portion. The step is used for positioning the second pinion gear 22. Also, the radially-cut gear teeth 22a on the axial end portion are used for preventing rotation of the second pinion gear 22 when attached to predetermined elements.

In short, the second engaging portion 21b is formed on one side of the second gear teeth 22a as the result of the cutting work. Therefore, diameter of the second engaging portion 22b is smaller than that of the second gear teeth 22a. Additionally, the second engaging portion 22b has small-diameter teeth formed by radially cutting the second gear teeth 22a. The second pinion gear 22 is arranged between the drag disk 42 and the first pinion gear 21. The second pinion gear 22 is thereby prevented from moving in the axial direction.

The engagement piece 23 is non-rotatably arranged in the interior of the slit 20a of the handle shaft 20. A protrusion 23a is formed in the center of the engagement piece 23. The protrusion 23a is positioned on the inner peripheral side of a spring receiver 26 when the engagement piece 23 is positioned on the second main gear 19 side. The spring receiver 26 is formed in a flange shape, and receives the compression spring 24a. The spring receiver 26 is fixed to the base end of the handle shaft 20 by means of a predetermined screw.

As illustrated in FIG. 2, the operation shaft 25 penetrates the handle shaft 20 and protrudes outward from the handle shaft 20. The operation shaft 25 is supported by a nut 27. The operation shaft 26 is thereby capable of moving in the axial direction. The nut 27 fixes the handle 4 screwed onto the protruding end of the handle shaft 20 to the handle shaft 20. An annular groove 25a is formed on the outer-protruding end of the operation shaft 25. Additionally, the handle 4 is provided with a slide-type stopper 28. The stopper 28 is engaged with the annular groove 25a. On the other hand, as illustrated in FIG. 3, a spring receiving member 29 is attached to the opposite end of the operation shaft 25. The spring receiving member 29 receives the compression spring 24b. The tip of the operation shaft 25 is fitted with the spring receiving member 29. A slit 29a is formed in the spring receiving member 29. The slit 29a is engaged with the engagement piece 23. The engagement piece 23 is also pressed by the slit 29a.

According to the rotation transmission mechanism 6 with the above-mentioned structure, when the operation shaft 25 is pressed into the handle shaft 20 as illustrated just below Axis Y of the operation shaft 25 in FIG. 3, the engagement piece 23 is positioned on the second main gear 19 side. Accordingly, rotation of the handle 4 is transmitted to the second pinion gear 22 via the second main gear 19. Consequently, the spool shaft 2 and the spool 3 rotate at low speed. On the other hand, when the operation shaft 25 is pulled by sliding the slide-type stopper 28 as illustrated just above Axis Y of the operation shaft 25 in FIG. 3, the engagement piece 23 is positioned on the first main gear 18 side. Accordingly, rotation of the handle 4 is transmitted to the first pinion gear 21 via the first main gear 18. Consequently, the spool shaft 2 and the spool 3 rotate at high speed.

Structure of Reverse Prevention Mechanism

As illustrated in FIGS. 4 and 5, the reverse prevention mechanism 7 is a one-way clutch with a pawl member. The reverse prevention mechanism 7 includes the rotation member 30, the pawl member 31, and an urging member 32. The rotation member 30 includes an outer peripheral portion 30b with a plurality of first engagement members 30a. The pawl member 31 is engaged with the first engagement members 30a. The urging member 32 urges the pawl member 31 toward the first engagement members 30a.

The rotation member 30 is a tubular member made of the same metal as the second pinion gear 22. Diameter of the rotation member 30 is larger than that of the second pinion gear 22. For example, the plurality of first engagement members 30a includes gear teeth arranged at predetermined intervals in the circumferential direction of the rotation member 30. The plurality of first engagement members 30a are arranged on the outer peripheral side of the second pinion gear 22. The plurality of first engagement members 30a are further arranged between the first pinion gear 21 and the drag disk 42. The outer peripheral portion 30b of the rotation member 30 further includes a third engagement coupling portion 30c. The third engagement coupling portion 30c includes a plurality of second engagement members. The second engagement members of the third engagement coupling portion 30c are formed in the same shape as a part of the first engagement members 30a. The circumferential diameter of the second engagement members of the third engagement coupling portion 30c is smaller than the circumferential diameter of the first engagement members 30a. The third engagement coupling portion 30c is coupled to the drag disk 42. The rotation member 30 is thereby capable of integrally rotating with the drag disk 42. A through hole 30d is formed in the center of the rotation member 30. The second engaging portion 22b of the second pinion gear 22 passes through the through hole 30d. A gap of approximately 0.01 to 0.05 mm is formed between the through hole 30d and the second engaging portion 22b. Accordingly, the rotation member 30 does not make contact with the second pinion gear 22. However, the rotation member 30 is substantially supported by the second pinion gear 22.

The rotation member 30 is formed by the cutting work. Specifically, a component is firstly prepared for the cutting work. This component has the the first engagement members 30a on its entire surface. Then, either of axial-end portions of the concavo-convex portion 30a is radially cut to some extent while the rest of the concavo-convex portion 30a remains to be uncut. Thus, diameter of the radially-cut axial-end portion results in smaller than diameter of the uncut portion. In other words, a step is formed between the radially-cut axial-end portion and the uncut portion. The step is used for positioning the rotation member 30. Also, the radially-cut axial-end portion is used for preventing rotation of the rotation member 30 when attached to predetermined elements.

In short, the third engagement coupling portion 30c is formed on either of axial-end portions of the first engagement members 30a as the result of the cutting work. Therefore, diameter of the third engagement coupling portion 30c is smaller than that of the first engagement members 30a. Additionally, the third engagement coupling portion 30c has small-diameter convex-concave by radially cutting the convexo-concave portion 30a. The rotation member 30 is arranged between the drag disk 42 and the second pinion gear 22. The rotation member 30 is thereby prevented from moving in the axial direction.

The pawl member 31 is formed by press-punching of a stainless-alloy thin plate. In the present embodiment, the pawl member 31 is formed by two members. The two members have the same thickness. The pawl member 31 is pivotally coupled to the reel unit 1. The pawl member 31 is configured to be positioned in either an engagement position or a remote position. The pawl member 31 is engaged with the convexo-concave portion 30a on the engagement position. The pawl member 31 thereby prevents reverse rotation of the drag disk 42. When the pawl member 31 is detached from and away from the convexo-concave portion 30a, the pawl member 31 is positioned in the remote position. The pawl member 31 includes a tip 31a, an attachment portion 31b, and an engagement protrusion 31c. The tip 31a is engaged with the convexo-concave portion 30a. The attachment portion 31b is formed in a hole shape. The third insertion member 15c is inserted into the attachment portion 31b. The pawl member 31 is thereby capable of pivoting around the third insertion member 15c. The engagement protrusion 31c radially extends from the attachment portion 31b toward the opposite side of the tip 31a.

As illustrated in FIG. 5, when the engagement protrusion 31c is positioned in the engagement position, it makes contact with the inner side of the second cover member 12b. Thus, the engagement protrusion 31c keeps the engagement position. A retaining member 36 (e.g., E-shaped retaining ring) retains the pawl member 31 with respect to the third insertion member 15c.

The urging member 32 includes a coil spring 34 and a press member 35. The coil member 34 is arranged on the outer peripheral side of a guide shaft 33 fixed to the second cover member 12b. The press member 35 is a closed-end tubular member. The press member 35 covers the coil member 34, and presses the engagement protrusion 31c. Specifically, the press member 34 presses the engagement protrusion 31c toward a protrusion 12h formed on the second cover member 12b. Accordingly, the pawl member 31 is constantly urged to the engagement position. On the other hand, only when the spool 3 and the drag disk 42 rotate in the line-winding direction illustrated by Arrow in FIG. 5, the pawl member 31 pivots to the remote position.

According to the reverse prevention mechanism 7 with the above-mentioned configuration, the rotation member 30 is arranged between the second pinion gear 22 and the drag disk 42, and the pawl member 31 is engaged with the rotation member 30. Accordingly, both of the rotation member 30 and the pawl member 31 are capable of receiving load generated in the application of the drag force. In other words, the second pinion gear 22 does not receive the load in the application of the drag force, and the second gear teeth 22a of the second pinion gear 22 is accordingly prevented from being damaged.

Additionally, the outer peripheral portion 30a with large diameter and high strength is engaged with the drag disk 42. Therefore, even when large load is applied to the engaged elements, the engaged elements are not easily damaged.

Furthermore, the third engagement coupling portion 30c is engaged with the drag disk 42, and the third engagement coupling portion 30c is formed in the same shape as a part of the convexo-concave portion 30a. Therefore, the engagement structure will be easily formed by the common structure shared by the convexo-concave portion 30a and the engagement coupling portion 30c.

Also, diameter of the rotation member 30 is larger than that of the second pinion gear 22. When the second pinion gear 22 passes through the rotation member 30 and is directly engaged with the drag disk 42, strength of the rotation member 30 will be highly maintained.

Structure of Lever Drag Reel

As illustrated in FIG. 3, the lever drag mechanism 9 includes the friction disk 41, the drag disk 42, and the movement mechanism 43. The friction disk 41 is attached to the right end of the spool 3 (see FIG. 2). The drag disk 42 is opposed to the friction disk 41. The movement mechanism 43 reciprocates the spool shaft 2 in the axial direction.

The friction disk 41 is a washer-typed disk member made of material with a rub resistance property (e.g., carbon graphite and fiber reinforced resin). The friction disk 41 is fixed to the outer surface of the right flange portion 3b of the spool 3 by means of a plurality of fixation bolts 50. The fixation bolts 50 are arranged at predetermined intervals in the circumferential direction of the friction disk 41.

As illustrate in FIGS. 3 and 4, the drag disk 42 includes a disk body 45 and a brake disk 46. The disk body 45 is engaged with the first and second pinion gears 21 and 22 and the rotation member 30. The disk body 45 is thereby capable of integrally rotating with them. The brake disk 46 is fixed to the disk body 45 by means of a plurality of fixation bolts 51. The brake disk 46 is opposed to the friction disk 41. For example, the brake disk is made of stainless. The reverse prevention mechanism 7 prevents rotation of the drag disk 42 in the line-releasing direction.

For example, the disk body 45 is a disk-shaped member made of aluminum die-cast with high thermal conductivity. The disk body 45 is rotatably supported by the spool shaft 2 through a bearing 52. The brake disk 46 is fixed to the disk body 45, and the fixation side of the disk body 45 is opposed to the spool 3. The Center portion of the brake disk 46 and the center portion of the fixation side of the disk body 45 are dented for avoiding the contact with the fixation bolts 50 screwed into the friction disk 41.

First to third engagement attachment portions 45a, 45b, and 45c are formed on the other side of the disk body 45 (i.e., the side opposite from the fixation side for the brake disk 46). The first pinion gear 21 is engaged with the first engagement attachment portion 45a. The second pinion gear 22 is engaged with the second engagement attachment portion 45b. The rotation member 30 is engaged with the third engagement attachment portion 45c. The disk body 45 is thereby capable of integrally rotating with the first pinion gear 21, the second pinion gear 22 and the rotation member 30 of the reverse prevention mechanism 7, respectively.

The first engagement attachment portion 45a is engaged with the first engaging portion 21c of the first pinion gear 21. The first engagement attachment portion 45a is arranged radially outward of the through hole that the spool shaft 2 penetrates. The first engagement attachment portion 45a is dented radially outward in a convexo-concave shape. Diameter of the convexo-concave portion is slightly smaller than that of the first gear teeth 21a. The first engagement attachment portion 45a further includes a first bottom 45d. The first bottom 45d abuts on the end surface of the first engaging portion 21c of the first pinion gear 21.

The second engagement attachment portion 45b is engaged with the second engagement coupling portion 21b of the second pinion gear 22. The second engagement attachment portion 45b is arranged radially outward of the first attachment portion 45a. The second engagement attachment portion 45b is dented radially outward in a convexo-concave shape. Diameter of the convexo-concave portion is slightly smaller than that of the second gear teeth 22a. Additionally, a second bottom 45e of the first engagement attachment portion 45b abuts on the end surface of the second engagement coupling portion 21b of the second pinion gear 22.

The third engagement attachment portion 45c is engaged with the third engagement coupling portion 30c of the rotation member 30. The third engagement attachment portion 45c is arranged radially outward of the second engagement attachment portion 45b. The third engagement attachment portion 45c is dented radially outward in a convexo-concave portion. Diameter of the convexo-concave portion is slightly smaller than that of the convexo-concave portion 30a. A third bottom 45f of the third engagement attachment portion 45c abuts on the end surface of the third engagement coupling portion 30c of the rotation member 30.

In this case, the first pinion gear 21 is interposed and supported between the inner ring of the bearing 16c and the first bottom 45d of the first engagement attachment portion 45a. Thus the first pinion gear 21 is arranged in a predetermined position.

The second pinion gear 22 is interposed and supported between the second bottom 45e of the second engagement attachment portion 45b and a step between the first gear teeth 21a and the first engaging portion 21c of the first pinion gear 21. Thus the second pinion gear 22 is arranged in a predetermined position.

The rotation member 30 is interposed and supported between the third bottom 45f of the third engagement attachment portion 45c and a step between the second gear teeth 22a and the second engaging portion 22b of the second pinion gear 22. Thus the rotation member 30 is arranged in a predetermined position.

As illustrated in FIG. 3, a drag cover 55 covers the outside of the drag disk 42. For example, the drag cover 55 is made of aluminum die-cast with predetermined thermal conductivity performance. The drag cover 55 is fixed to the end surface of the flange portion 3b of the spool 3 by means of a predetermined bolt member. Additionally, a sealing member 56 is attached to a space between the drag disk 42 and the inner periphery of the drag cover 55 while a sealing member 57 is attached to a space between the drag cover 55 and the spool 3.

As illustrated in FIG. 3, the movement mechanism 43 includes a drag lever 60, a pull mechanism 61, and a second spring member 71. The drag lever 60 is pivotally provided in the reel unit 1. The pull mechanism 61 is configured to pull and move the spool shaft 2 in the rightward direction (see FIG. 3) in accordance with the clockwise pivot of the drag lever 60 (see FIG. 1). The second spring member 17b is configured to move the spool shaft in the leftward direction (see FIG. 3) in accordance with the counter-clockwise movement of the drag lever 60 (see FIG. 1) by urging the spool shaft 2 in the leftward direction (see FIG. 3).

Actions of Lever Drag Reel

According to the lever drag reel with the above-mentioned configuration, the drag force of the lever drag mechanism 9 is regulated by the pivot of the drag lever 60. When the drag lever 60 is positioned in a drag-release position (i.e., front-most pivot position in FIG. 1), the friction disk 41 is detached and away from the drag disk 42 in the lever drag mechanism 9. Accordingly, the drag release condition is produced, and the spool 3 is capable of freely rotating. An angler casts the fishing rod in this condition. When the drag lever 60 is pivoted in the clockwise direction (see FIG. 1) on the drag-release condition, the pull mechanism 61 pulls and moves the spool shaft 2 outward in the spool direction (i.e., rightward direction in FIG. 2). Accordingly, the pool shaft 2 and the spool 3 gradually move in the rightward direction. Consequently, the friction disk 41 strongly presses the drag disk 42, and the drag force is accordingly increased.

When the strong force greater than the set drag force is applied to a fishing line while an angler performs fishing, the spool 3 rotates in the line-releasing direction. Simultaneously, the friction disk 41 rotates relative to the drag disk 42, and the drag disk 42 is about to rotate in the line-releasing direction. In this condition, the reverse prevention mechanism 7 is activated. Accordingly, the pawl member 31 is engaged with the rotation member 30, and reverse rotation of the drag disk 42 is prevented. In this case, the pawl member 31 is not engaged with the second pinion gear 22 but is engaged with the rotation member 30. Therefore, it is possible to prevent damage of the second pinion gear 22. Furthermore, reverse rotation of the rotation member 30 is prevented in the application of the drag force. Accordingly, power is not transmitted from the first pinion gear 21 (or the second pinion gear 22) to the first main gear 18 (or the second main gear 19).

Therefore, the first and second pinion gears 21 and 22 are not damaged in the application of the drag force.

Other Example Embodiments

Embodiment (a)

In the above-mentioned embodiment, the rotation member 30, the first pinion gear 21 and the second pinion gears 22 are separately engaged with and coupled to the drag disk 42. However, the present invention is not limited to the configuration. For example, any one of the rotation member 30, the first pinion gear 21 and the second pinion gear 22 may be engaged with and coupled to the drag disk 42 while the rest of them may be engaged with and coupled to a predetermined member engaged to the drag disk 42.

Embodiment (b)

In the above-mentioned embodiment, the present invention has been explained with the two-stage variable-speed lever drag reel. However, the present invention is not limited to the configuration. For example, the preset invention may be applied to a non-variable-speed lever drag reel.

Embodiment (c)

In the above-mentioned embodiment, material forming elements of the lever drag reel is only an example and does not limit the present invention. Any other suitable material may be used for the elements of the lever drag reel of the present invention.

General Interpretation

A used herein, the following directional terms "forward, rearward, above, downward, vertical, horizontal, below and transverse" as well as any other similar directional terms refer to those directions of a device equipped with the present invention. Accordingly, these terms, as utilized to describe aspects of the present invention, should be interpreted relative to a device equipped with the present invention.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applied to words having similar meanings such as the terms, "including," "having," and their derivatives. Also, the term "part," "section," "portion," "member," or "element" when used in the singular can have the dual meaning of a single part or a plurality of parts.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A reverse prevention mechanism for a lever drag reel to prevent reverse rotation of a drag disk in a line-releasing direction by braking a spool adapted to rotate with respect to a reel unit, rotation being transmitted to the drag disk by way of a handle and a pinion gear, the reverse prevention mechanism comprising:
   a rotation member adapted to rotate integrally with the drag disk, the rotation member including an outer peripheral portion arranged between the pinion gear and the drag disk, the outer peripheral portion including a plurality of first engaging members and a plurality of second engaging members abutting and being arranged on an axial end of the plurality of first engaging members, the plurality of second engaging members engaging the drag disk to rotate integrally with the drag disk;
   a pawl member pivotally coupled to the reel unit, the pawl member being situated between an engagement position where a tip portion of the pawl member is engaged with the first engaging members of the outer peripheral portion of the rotation member to prevent reverse rotation of the drag disk and a remote position where the pawl member is detached and positioned away from the outer peripheral portion of the rotation member; and
   an urging member adapted to urge the pawl member toward the engagement position.

2. The reverse prevention mechanism according to claim 1, wherein the circumferential diameter of the second engaging members is smaller than the circumferential diameter of the first engaging members.

3. The reverse prevention mechanism according to claim 2, wherein the first engaging members include gear teeth and the second engaging members are formed by cutting the gear teeth in the radial direction.

4. The reverse prevention mechanism according to claim 2, wherein a diameter of the outer peripheral portion is larger than that of the pinion gear, the rotation member further includes a through hole to allow at least part of the pinion gear to pass therethrough.

5. The reverse prevention mechanism according to claim 2, wherein the plurality of second engaging members contacts the plurality of first engaging members.

6. The reverse prevention mechanism according to claim 5, wherein the plurality of second engaging members engages with an engagement attachment portion of the drag disk arranged radially outside the plurality of second engaging members.

7. The reverse prevention mechanism according to claim 6, wherein an end surface of the plurality of second engaging members abuts a bottom of the engagement attachment portion of the drag disk.

8. The reverse prevention mechanism according to claim 2, wherein the rotation member has a through-hole, and an inner periphery of the through-hole contacts a portion of the drag disk.

9. A lever drag mechanism for a lever drag reel comprising:
   a friction disk configured to be attached to an end of a spool configured to rotated with respect to a reel unit;
   a drag disk having a disk body mounted to a spool shaft and a brake disk attached to the disk body, the disk body having
      a through hole, and an engagement attachment portion arranged radially outside the through hole; and
   a reverse prevention mechanism being configured to prevent reverse rotation of the drag disk in a line-releasing direction by braking the spool, the reverse prevention mechanism having a rotation member arranged to rotate integrally with the drag disk, the rotation member including an outer peripheral portion including a plurality of first engaging members and a plurality of second engaging members abutting and being arranged on an axial end of the plurality of first engaging members, the plurality of second engaging members engaging the engagement attachment portion of the disk body to rotate integrally with the disk body, a pawl member pivotally coupled to the reel unit, the pawl member being situated between an engagement position where a tip portion of the pawl member is engaged with the first engaging members of the outer peripheral portion of the rotation member to prevent reverse rotation of the drag disk and a remote position where the pawl member is detached and positioned away from the outer peripheral portion of the rotation member, and an urging member adapted to urge the pawl member toward the engagement position.

10. The lever drag mechanism according to claim 9, further comprising a pinion gear having an engaging portion, wherein the disk body has an inner engagement attachment portion arranged radially outside the through hole, the engagement attachment portion is arranged radially outside the inner engagement attachment portion, and the inner engagement attachment portion is engaged with the engaging portion of the pinion gear to rotate integrally with the disk body.

11. The lever drag mechanism according to claim 10, further comprising a second pinion gear arranged radially outside the pinion gear, the second pinion having a second engaging portion, wherein the disk body has a middle engagement attachment portion arranged radially outside the inner engagement attachment portion, the engagement attachment portion is arranged radially outside the middle engagement attachment portion, and the middle engagement attachment portion is engaged with the second engaging portion to rotate integrally with the disk body.

* * * * *

UNITED STATES PATENT AND TRADEMARK OFFICE
CERTIFICATE OF CORRECTION

PATENT NO. : 7,784,725 B2
APPLICATION NO. : 12/426923
DATED : August 31, 2010
INVENTOR(S) : Chew Chun Wee et al.

It is certified that error appears in the above-identified patent and that said Letters Patent is hereby corrected as shown below:

On the cover page change the listing of (73) from

"(73) Assignee: Shimano Inc., Osaka, Japan"

to

-- (73) Assignee: Shimano Components (Malaysia) SDN. BHD., Pontian, Malaysia --

Signed and Sealed this
Fifth Day of April, 2011

David J. Kappos
*Director of the United States Patent and Trademark Office*